(12) United States Patent
Broersma

(10) Patent No.: US 7,316,431 B1
(45) Date of Patent: *Jan. 8, 2008

(54) AUTO-ADAPTING FITTING

(75) Inventor: Lester Broersma, San Diego, CA (US)

(73) Assignee: JT Sports, LLC, Bentonville, AK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/523,969

(22) Filed: Sep. 20, 2006

Related U.S. Application Data

(63) Continuation-in-part of application No. 10/772,814, filed on Feb. 4, 2004.

(51) Int. Cl.
*F16L 21/00* (2006.01)

(52) U.S. Cl. .................. 285/399; 285/417; 285/235; 124/49; 124/45

(58) Field of Classification Search ........... 285/403, 285/417, 400, 399, 374, 913, 235, 237, 304, 285/334.3; 403/291, 344; 124/49, 50, 51.1, 124/47, 45
See application file for complete search history.

(56) References Cited

U.S. PATENT DOCUMENTS

| | | | |
|---|---|---|---|
| 1,007,295 A | 10/1911 | Lane | |
| 1,881,943 A | 10/1932 | Rader | |
| 3,592,491 A * | 7/1971 | Glover | 285/230 |
| 3,980,805 A | 9/1976 | Lipari | 174/88 C |
| 4,126,339 A * | 11/1978 | Thompson | 285/369 |
| 5,166,457 A | 11/1992 | Lorenzetti | 42/49 |
| 5,954,448 A | 9/1999 | Shim | 403/291 |
| 6,739,322 B2 | 5/2004 | Rice et al. | 124/49 |
| 7,229,105 B2 * | 6/2007 | Broersma | 285/399 |

* cited by examiner

*Primary Examiner*—David Bochna
(74) *Attorney, Agent, or Firm*—Keisling, Pieper & Scott, PLC; David B. Pieper; Meredith K. Lowry

(57) ABSTRACT

An auto-adapting fitting for releasably connecting in an end-to-end orientation, a first tube end to a second tube end having an outer diameter within a specified range for use between the ammunition feed port of a paintball marker and the outlet port of a paintball magazine. The fitting is formed onto the end portion of the marker inlet tube. The fitting comprises a resilient sleeve-shaped collar having a number of radially, inwardly extending projections that pass through corresponding radially penetrating holes through the side wall of the end portion of the feed port near its upper opening. The projections bear against the outer surface of the magazine outlet tube. Magazine outlet tubes of a larger outer diameter will cause the collar to be resiliently pushed outwardly.

12 Claims, 2 Drawing Sheets

AUTO-ADAPTING FITTING

CROSS-REFERENCE TO RELATED APPLICATIONS

This application claims priority to and is a continuation-in-part of U.S. application Ser. No. 10/772,814, filed Feb. 4, 2004.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

This invention relates to pipe fittings and more specifically to those fittings which accommodate different size pipe ends such as those which exist on the outlet ports of detachable ammunition magazines for paintball markers.

2. Description of the Known Art

The ever-increasing popularity of war games in which frangible paintballs are shot to mark a living target, has prompted many improvements designed to enhance the rapid and sustained firing of a large quantity of paintball projectiles. As shown in FIG. 1, most recent models of paintball markers 1 use a substitutable magazine 2 for carrying a quantity of spherical paintball projectile ammunition 3 as disclosed in Lorenzetti, U.S. Pat. No. 5,166,457 incorporated herein by this reference. The magazine 2 mounts to the upper section of the marker by engaging its tubular outlet port 4 to the tubular feed port 5 of the marker. When so mounted, both ports are generally arranged coaxially to form a cylindrical passage through which the projectiles freely flow.

Magazines are often manufactured having dissimilarly dimensioned outlet port tubes thereby resulting in a magazine which is loosely fitted to the marker which can allow for unintentional disorientation or even dislodgement of the magazine leading to an interruption in rapid and sustained firing.

Various solutions have been proposed including intermediate adapters having opposite ends each sized to fit particular magazine sizes to various marker feed port tube sizes. Such solutions increase the bulkiness of the magazine and typically require the user to have a different adapter for each different size magazine. Further, such adapters often increase the length of the cylindrical passage. The change in the diameter of the passage can lead to fouling or otherwise less than a smooth rapid flow of paintballs.

The present invention is an attempt to overcome the above-identified problems.

Details of different types of fittings are outlined in U.S. Pat. No. 1,007,295 issued to Lane on Oct. 31, 1911, U.S. Pat. No. 1,881,943 issued to Rader on Oct. 11, 1932, U.S. Pat. No. 3,980,805 issued to Lipari on Sep. 14, 1976, U.S. Pat. No. 5,166,457 issued to Lorenzetti on Nov. 24, 1992, and U.S. Pat. No. 5,954,448 issued to Shim on Sep. 21, 1999.

Each of these patents is hereby expressly incorporated by reference in their entirety. Several of these patents describe different areas of the various arts as noted by the following comments.

U.S. Pat. No. 1,007,295 issued to Lane on Oct. 31, 1911 entitled Pneumatic Hammer discusses pneumatic hammers having a detachable nose piece and a means for securing said nose piece to the hammer.

U.S. Pat. No. 1,881,943 issued to Rader on Oct. 11, 1932 entitled Joint discusses joints between pipes.

U.S. Pat. No. 3,980,805 issued to Lipari on Sep. 14, 1976 entitled Quick release sleeve fastener discusses an electrical interconnection apparatus for coaxial cable and the like comprising a shielding sleeve removably slipped about, and covering access ports in, a tubular conductor featuring a snap-on retaining clip. An inwardly extending pin on the inner surface of the clip is inserted in aligned apertures in the sleeve and conductor to secure the sleeve in place. The clip is readily pried off to permit moving aside the sleeve for access through the ports to solder joints, for example.

U.S. Pat. No. 5,166,457 issued to Lorenzetti on Nov. 24, 1992 entitled Ammunition magazine for a paintball gun discusses a magazine for gravity feed of frangible, paint-containing projectiles into a gas operated gun, the magazine which comprises a generally closed hollow container with a smooth inner surface, a filling port positioned on its upper portion and an outlet port positioned on a lower most portion. A transfer tube is attached externally to the outlet port to communicate the outlet port to a feed port on the gun. A channel is formed along the mixer surface so that the channel will direct projectiles along its length by gravity to its terminus at the outlet port. A raised portion of the inner surface around a portion of the circumference of the outlet port effectively forms a dam precluding flow of projectiles into the outlet port from the portion of the circumference so blocked.

U.S. Pat. No. 5,954,448 issued to Shim on Sep. 21, 1999 entitled Apparatus for coupling video printed circuit board assembly of monitor discusses a video printed circuit board mounted on a slotted holder which closely receives the neck of a CRT and has a plurality of circumferentially-diverged apertures which receive projections extending from a circumscribing elastic band that compresses the holder, the projections frictionally engaging the neck.

These prior art patents fail to teach the fitting for releasably connecting in an end-to-end orientation with a first tube end connecting to a second tube end having an outer diameter within a specified range for use between the ammunition feed port of a paintball marker and the outlet port of a paintball magazine. Thus, it may be seen that these prior art patents are very limited in their teaching and utilization, and an improved fitting apparatus is needed to overcome these limitations.

SUMMARY OF THE INVENTION

The principal and secondary objects of this invention are to provide a simple, easy to use, lightweight, non-bulky, reusable, and inexpensive to manufacture auto-adapting fitting for use on a paintball gun feed port which releasably but snugly engages magazine outlet ports in a range of sizes.

These and other objects are achieved by a fitting having an elastomeric sleeve-shaped collar having a number of radially, inwardly extending projections that pass through corresponding radially penetrating holes through the side wall of the end portion of a feed port tube near its upper opening. The projections bear against the outer surface of the magazine outlet port tube. Magazine outlet tubes having a larger outer diameter will cause the collar to be resiliently pushed outwardly. The projections are shaped to have a downward and inward taper to encourage easy insertion of the outlet tube. The resiliency of the collar is axially variable to cause a greater inwardly biasing force proximate to the thickened portion of the projection.

BRIEF DESCRIPTION OF THE SEVERAL VIEWS OF THE DRAWINGS

In the following drawings, which form a part of the specification and which are to be construed in conjunction therewith, like reference numerals have been employed throughout wherever possible to indicate like parts in the various views.

DETAILED DESCRIPTION OF THE INVENTION

Figure 1:
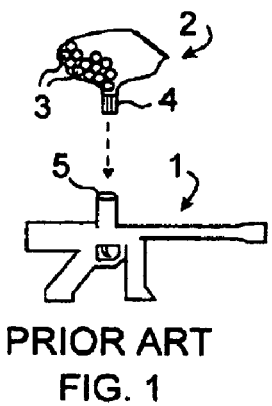
FIG. 1 is a prior art diagrammatic side view of a magazine being attached to a paintball marker.
Figure 2:
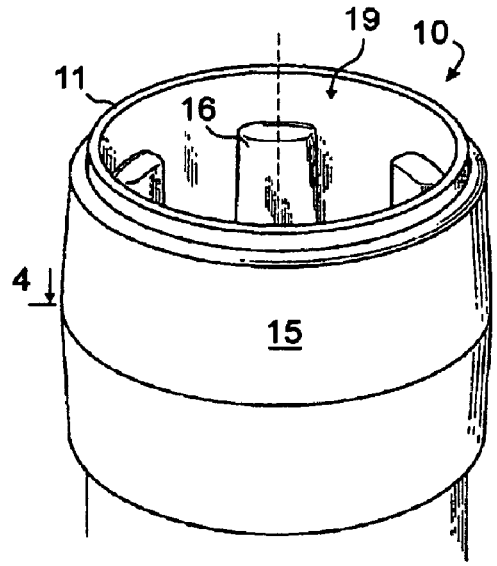
FIG. 2 is a diagrammatic perspective view of an auto-adapting fitting formed upon a top open end of a paintball marker feed port tube according to the invention.
Figure 3:
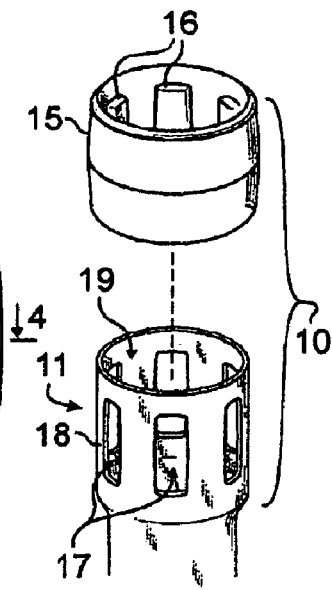
FIG. 3 is a diagrammatic perspective exploded view of the auto-adapting fitting of FIG. 2.

Referring now to the drawings, there is shown in FIGS. 2-5 an auto-adapting fitting 10 for releasably connecting in a substantially coaxial, end-to-end orientation, a first feed port tube end 11 formed onto a paintball marker to a second outlet port tube end 12 formed by a paintball hopper or magazine outlet port. The fitting comprises a resilient sleeve-shaped collar 15 having a number of angularly and evenly spaced-apart radially, inwardly extending prominences or projections 16 that pass through corresponding radially penetrating holes 17 through the sidewall 18 of the upper end portion of the feed port tube 11 near its upper opening 19. The collar acts as a clamping structure so that the projections are inwardly biased to bear against the outer surface 13 of the magazine outlet tube 12.

The dimensions of the fitting are selected to accommodate outlet tubes having an outer diameter within a specified range. The radial length of each extension is selected so that acting in concert, they contact outlet tubes having an outer diameter at the lower limit of the range. The upper limit of the range is the inner diameter of the feed tube port upper end 11. The inside diameter of the lower portion 14 of the feed tube is preferably selected to be greater than or equal to the upper limit of the inside diameter of the outlet tube size ranges.

The collar is preferably made from a durable, slightly resilient material such as polyurethane plastic. The feed tube of the paintball marker is formed from durable, rigid material such as steel.

Figure 4:
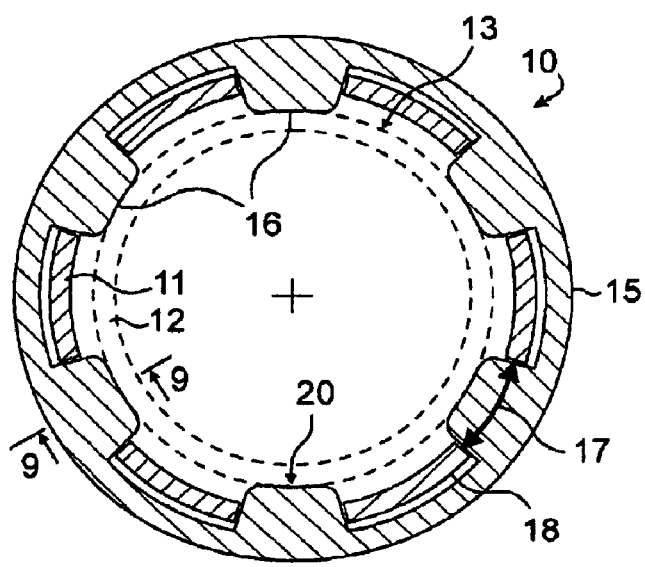
FIG. 4 is a diagrammatical top cross-sectional view of the fitting of FIG. 2 taken along line 4-4 and being distended by an engaged magazine outlet tube.

Referring now to FIG. 4, an outlet tube 12 inserted into the fitting contacts the most radially inwardly located surfaces 20 of the projections 16. Since the outer diameter of the outlet tube 12 is larger than the radially inwardmost surfaces 20 of the collar, the projections are forced outwardly. Due to the resilient nature of the collar, it provides a positive friction contact between the collar 15 and the outlet tube 12 resisting the outlet tube's dislodgement.

Figure 5:
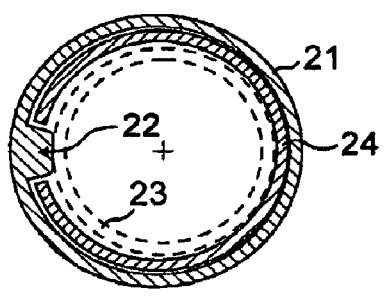
FIG. 5 is a diagrammatical top cross-sectional view of a fitting according to an alternate embodiment of the invention having a single prominence.
Figure 6:
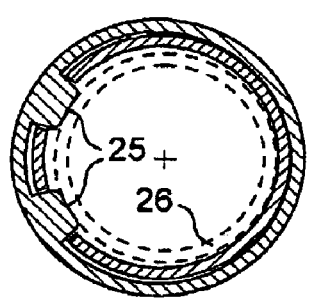
FIG. 6 is a diagrammatical top cross-sectional view of a fitting according to an alternate embodiment of the invention having two non-evenly spaced-apart prominences.

Referring now to FIG. 5, those skilled in the art will readily appreciate implementation of the invention wherein a collar 21 has a single prominence 22 is used to force the outlet tube 23 to one side which is roughly in axial alignment with the feed tube 24. Further, referring to FIG. 6, two prominences 25 which are non-equidistantly spaced apart can provide a more stable engagement of a feed tube 26. The location of the center of the feed tube below the fitting should be selected to provide for the least off-center alignment for outlet tubes within the selected range. In other words, when using a fitting such as in FIGS. 5 and 6, the upper portion of the feed tube is not coaxial with the bottom portion of the feed tube, but rather with the expected axis of the attached outlet tube. The disadvantage of the embodiments of FIGS. 5 and 6 are that a different sized outlet tube will have a slightly different off-center alignment.

Figure 7:
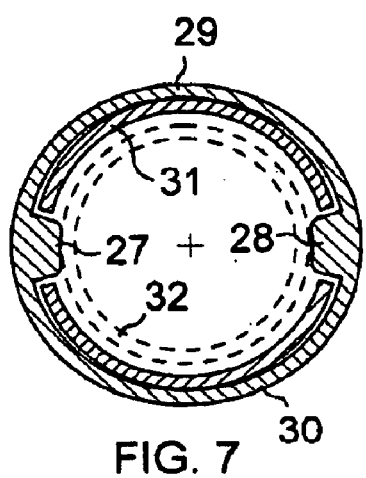
FIG. 7 is a diagrammatical top cross-sectional view of a fitting according to an alternate embodiment of the invention having two evenly spaced-apart prominences.

Referring now to FIG. 7, in order to encourage more precise coaxial centering of the connected tubes, the collar preferably has at least two evenly spaced apart prominences 27, 28. In this way, webbing portions 29, 30 of the collar between the prominences contact the outer surface of the feed tube 31 and thereby encourage centering of the outlet tube 32. When evenly spaced apart, an even number of prominences provide a diametrically opposing clamping force between opposite pairs. An odd number of prominences avoids diametrically opposing clamping forces.

More prominences will provide a more radially distributed clamping force. Most preferably, the collar has at least six prominences.

Figure 8:
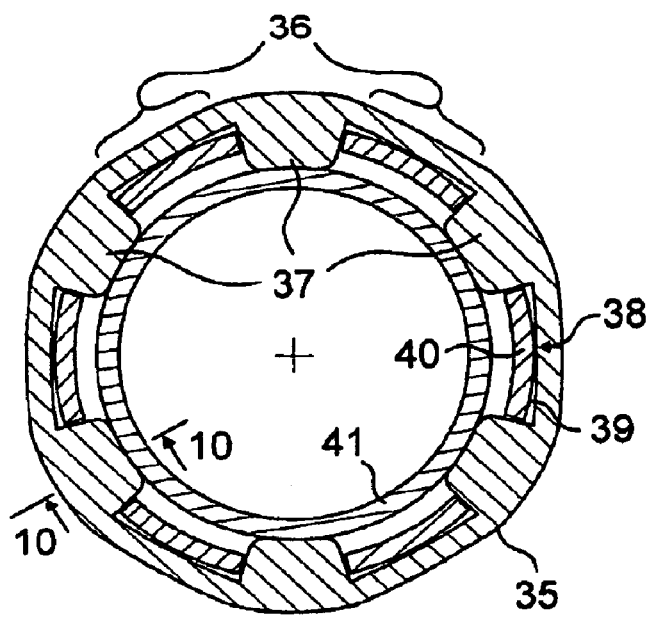
FIG. 8 is a diagrammatical top cross-sectional view of the fitting engaged by an outlet tube and showing an exaggerated deformation of the collar.

As shown in an exaggerated fashion in FIG. 8, the dimensions of the collar 35 can be selected so that webbing portions 36 between the projections 37 are stretched and flattened by the outward movement of the projections. A central region 28 of a webbing portion contacts the outer surface 39 of the feed tube 40 thereby centering the positioning of the outlet tube 41 within the feed tube.

A fewer number of prominences will allow the webbing of a collar made from a material having a particular resiliency to more consistently contact the outer surface of the feed tube.

Figure 9:
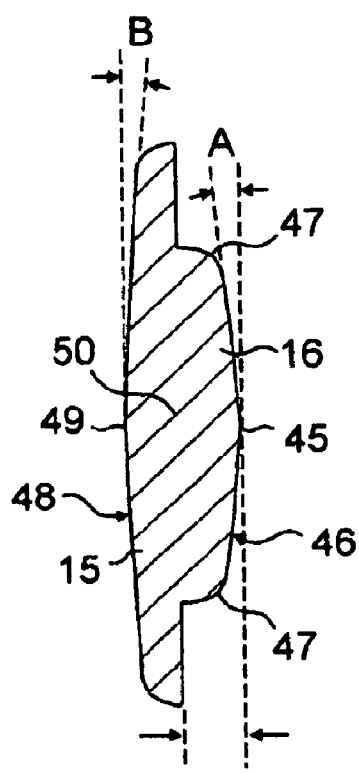
FIG. 9 is a diagrammatical cross-sectional side view of a portion of the auto-adapting collar of FIG. 4 taken along line 9-9.

Referring now to FIG. 9, the collar 15 is preferably shaped so that each projection 16 has an axially medial hump 45 gradually formed by an inwardly facing surface 46 tapering or gently sloping from its distal extremities 47 to the hump.

Figure 10:
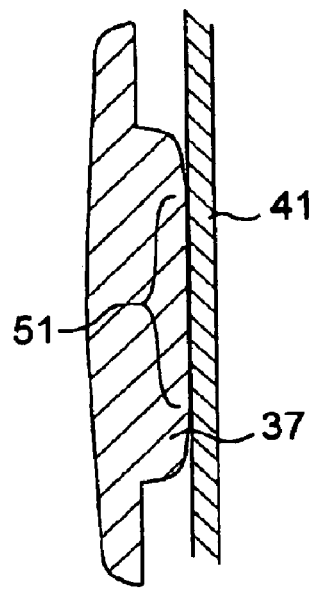
FIG. 10 is a diagrammatical cross-sectional side view of a portion of the collar of FIG. 8 taken along line 10-10.

This tapered surface forms an angle A from the vertical of between about 1 and 5 degrees. This shape allows for easier insertion of oversized outlet tubes into the fitting since an upper portion of the prominence is more outwardly located than lower portion near the hump. The outer surface 48 of the collar is shaped to have a axially medial bulge 49 so as to cause greater radial stiffness in the axially medial portion 50 of the collar. As shown in FIG. 10, this causes a deformation of the central hump of the projection 37 thereby causing more flattened zone of contact 51 with the outlet tube 41.

The preferred collar is also axially symmetric about a plane normal to the central axis at the hump to allow installation in a flipped orientation.

While the present invention has been described as a fitting formed onto the feed port of the marker, those skilled in the art will readily appreciate that the invention can be easily adapted to form onto the outlet port of the magazine.

While the preferred embodiment of the invention has been described, modifications can be made and other embodiments may be devised without departing from the spirit of the invention and the scope of the appended claims.

What is claimed is:

1. An auto-adapting fitting for releasably connecting in a substantially coaxial, end-to-end orientation, a first paintball-associated device to a second paintball-associated device, said fitting comprises:

a first tube of a first paintball-associated device, said first tube having a first axial opening and a sidewall, said sidewall further having a plurality of apertures extending radially therethrough proximate to said first axial opening;

a second tube of a second paintball-associated device, said second tube having an outer diameter within a specified range;

a slightly resilient annular retaining ring circumferentially mounted to said outer diameter of said second tube, said ring having a plurality of friction prominences adapted to penetrate through said plurality of apertures of said sidewall; and wherein said ring has a medial bulge in thickness yielding an axially variable resiliency.

2. The fitting of claim 1, wherein said prominences are evenly spaced apart.

3. The fitting of claim 1, wherein there are at least two prominences.

4. The fitting of claim 1, wherein said ring is axially symmetric.

5. The fitting of claim 1, wherein said prominences are biased radially inwardly.

6. A fitting for releasably connecting a paintball marker to a paintball hopper in a substantially coaxial, end-to-end orientation, said fitting comprising:

a marker tube port connected to the paintball marker, said marker tube port having a sidewall and a plurality of holes therethrough;

a hopper tube port connected to the paintball hopper having an outer diameter within a specified range;

a slightly resilient collar having a first tube end for connection of said marker tube port and a second tube end for connection of said hopper tube port, said collar having a plurality of inwardly projecting prominences;

said holes sized, shaped and located to allow passage of said prominences therethrough to contact an outer surface of said hopper tube port.

7. The fitting of claim 6, wherein said collar further comprises a sleeve-shaped body.

8. The fitting of claim 6, wherein a first one of said prominences is shaped to have a tapered inner surface.

9. The fitting of claim 6, wherein said prominences are evenly spaced apart.

10. The fitting of claim 6, wherein there are at least two prominences.

11. The fitting of claim 6, wherein said collar is axially symmetric.

12. The fitting of claim 6, wherein said prominences are biased radially inwardly.

\* \* \* \* \*